United States Patent
Clarke et al.

(10) Patent No.: US 7,295,991 B1
(45) Date of Patent: Nov. 13, 2007

(54) EMPLOYMENT SOURCING SYSTEM

(75) Inventors: Peter I. Clarke, Stamford, CT (US);
Paul L. Rathblott, New Canaan, CT (US)

(73) Assignee: ERC Dataplus, Inc., Norwalk, CT (US)

( * ) Notice: Subject to any disclaimer, the term of this patent is extended or adjusted under 35 U.S.C. 154(b) by 1417 days.

(21) Appl. No.: 09/711,279

(22) Filed: Nov. 10, 2000

(51) Int. Cl.
*G06Q 30/00* (2006.01)

(52) U.S. Cl. .................. 705/8; 705/7; 705/9; 705/11; 705/40; 707/40

(58) Field of Classification Search .............. 705/7, 705/10, 14
See application file for complete search history.

(56) References Cited

U.S. PATENT DOCUMENTS

| | | | |
|---|---|---|---|
| 5,111,391 A | 5/1992 | Fields et al. | |
| 5,117,353 A | 5/1992 | Stipanovich et al. | |
| 5,164,897 A | 11/1992 | Clark et al. | |
| 5,197,004 A | 3/1993 | Sobotka et al. | |
| 5,832,497 A * | 11/1998 | Taylor | 707/104.1 |
| 5,940,812 A * | 8/1999 | Tengel et al. | 705/38 |
| 5,978,768 A | 11/1999 | McGovern et al. | |
| 6,029,141 A * | 2/2000 | Bezos et al. | 705/27 |
| 6,070,143 A | 5/2000 | Barney et al. | |
| 6,233,575 B1 * | 5/2001 | Agrawal et al. | 707/6 |
| 6,345,256 B1 * | 2/2002 | Milsted et al. | 705/1 |
| 6,618,734 B1 * | 9/2003 | Williams et al. | 707/104.1 |
| 6,757,674 B2 * | 6/2004 | Wiens et al. | 707/3 |
| 2002/0022982 A1 * | 2/2002 | Cooperstone et al. | 705/7 |
| 2002/0106617 A1 * | 8/2002 | Hersh | 434/236 |
| 2003/0182289 A1 * | 9/2003 | Anderson et al. | 707/10 |
| 2006/0019231 A1 * | 1/2006 | Pfenninger et al. | 434/350 |

FOREIGN PATENT DOCUMENTS

| | | | | |
|---|---|---|---|---|
| EP | 1 160 714 | * | 5/2001 | ............... 705/14 X |
| WO | WO 00/70481 | * | 11/2000 | ............... 705/14 X |
| WO | WO 00/77672 A2 | * | 12/2000 | |
| WO | WO 0137597 | * | 5/2001 | ............... 705/14 X |
| WO | WO 01/42984 | * | 6/2001 | ............... 705/14 X |

OTHER PUBLICATIONS

Dialog reference. File 20 #08604386, "Advanatage Hiring Tools Target Internet Recruiters; Online Screening and Interviewing Applications Cater to Electronic Job Boards" Dec. 7, 1999.*
Dialog reference. File 610 #00392047 "Recruiting Solutions Spearheads Online Testing by Addine eAssessments to its product Suite" Product Suite, Oct. 24, 2000.*

* cited by examiner

*Primary Examiner*—Raquel Alvarez
(74) *Attorney, Agent, or Firm*—Kirkpatrick & Lockhart Preston Gates Ellis LLP (57) ABSTRACT

An automated method for quickly determining whether a job seeking candidate is qualified for an available position by accepting the candidate's resume for storage, presenting the candidate with employer-created criteria and/or questions, rating the candidate's responses and forwarding only the resumes of qualified candidates to the employer.

21 Claims, 9 Drawing Sheets

Figure 1

Administration System
Main

Administration System
*Request a report*

EMPLOYMENT SOURCING SYSTEM

TECHNICAL FIELD

The present invention is directed, in general, to an automated system and method for matching job seekers with employers having available positions, based on the job seeker's qualifications and employer's job requirements. In particular, the invention is directed to an World Wide Web (WWW)-based system for creating a pool of job candidates, ascertaining and storing personal information and job-related qualifications, and selectively matching only those candidates possessing the specific qualifications and/or criteria set by the employer.

REFERENCE TO GOVERNMENT FUNDING

Not Applicable.

BACKGROUND OF THE INVENTION

For many years, employment agencies (sometimes called search firms) have been attempting to match job candidates to specific job criteria as required by employers. Most employment agencies receive payment only for those positions which they fill with qualified employee candidates. Therefore, in a highly competitive environment, speed in identifying and presenting candidates and presenting to potential employers is very important. It is also extremely important to be able to handle a large number of potential candidates in various fields in order to be in the best position to fill employers' job requirements as they open.

The most commonly known method of matching personnel to job specification criteria requires a person trained in job placement skills to manually review documents such as resumes and other qualifications related documents while comparing such documents to criteria specified by the potential employer. Such a manual system has several drawbacks. It is obviously very slow in most cases since there is no fast way to sort unqualified candidates from qualified candidates on a large-scale basis. In addition, it can be very time-consuming and therefore quite costly. Further, the amount of applicants may be limited if much of the information about the candidates must be remembered by the search consultants themselves. The amount of candidates may also be limited by the factors such as the geographical location of the job placement center, interpersonal skills of the interviewer, and failure to widely distribute notice of the available position or failure to distribute notice to the appropriate group of individuals. Use of such a system makes it difficult to identify and present a list of qualified candidates together with resumes and other needed information to the requestor in a short period of time.

Some automated systems for selecting personnel based on job criteria do exist. The majority of these systems merely store information regarding the qualifications of various candidates in a computer database as, for example, in the form of resumes. The searcher then types in certain key words which relate to the job qualification criteria hoping to match the key words with the job criteria. Such systems are limited by the fact that the use of keywords is very imprecise. This is due to the fact that job titles and, in particular, technological slang terms or "buzz" words have meanings which vary quite extensively from employer to employer and from one region to another. Further, such systems are not "user friendly" because they often require significant training and experience with the system before it can be used effectively. Such systems are further limited by misspellings which can commonly occur in large databases and which may cause candidates to be missed by a key word approach. Furthermore, these systems lack automated methods for immediately determining whether each candidate applying for a position meets the criterion for that particular position, while the application process is still being completed.

High speed, a low cost to hire, and quality candidates are the keys to any successful recruitment program in today's rapid-fire employment market. Downloading resumes from a database saves time but there remains a need for a resume screening process that utilizes an understanding of the available position, the respective business and employer's needs to select suitable candidates for employment.

SUMMARY OF THE INVENTION

In many ways the present invention performs much of the traditional functions of an employment agency. For instance, job-seeking candidates can submit resumes and various job preferences, or express interest in a particular position available, and the employer "clients" are saved the time and expense it would cost to find qualified applicants themselves. Recruiting, like most tasks, is vastly improved by computer automation and the Internet. The present invention makes use of both to offer advantages and improvements over previous systems by, among other things, providing a logically-reasoned though fully-automated and user-friendly method for determining in real-time whether a candidate suits a particular job based on the candidate's qualifications and client specifications.

The present invention incorporates client-established requirements to screen candidates with the particular job-related criteria supplied by potential employers. Using the client's own criteria to screen candidates yields intelligently chosen candidates who are best suited for the available position, which is comparable to that of an experienced human recruiter. However, the present invention is much more versatile and cost-effective because clients from diverse industries can supply and tailor their criterion to suit their own particular needs, which may include details related to highly specialized areas. The screening criteria may include tests which evaluate the candidate's technical proficiency, work-related skills, fit with company culture, or any other area which the client deems pertinent to the position. The candidate's results may thereafter be reviewed by the client Preferably, any questions posed to the candidate are answered by picking from multiple choice, yes or no, or otherwise easily gradable.

The inventive system is preferably operated at a WWW-site ("web site") which may be accessed by employment-seeking candidates through links from other web sites, client web sites or Internet search engines.

BRIEF DESCRIPTION OF THE DRAWINGS

The advantages, and the system and apparatus of the present invention will be understood from the following description taken together with the drawings, in which.

DETAILED DESCRIPTION OF THE INVENTION

FIGS. 1 through 9 illustrate one embodiment of the present invention.

Figure 1:
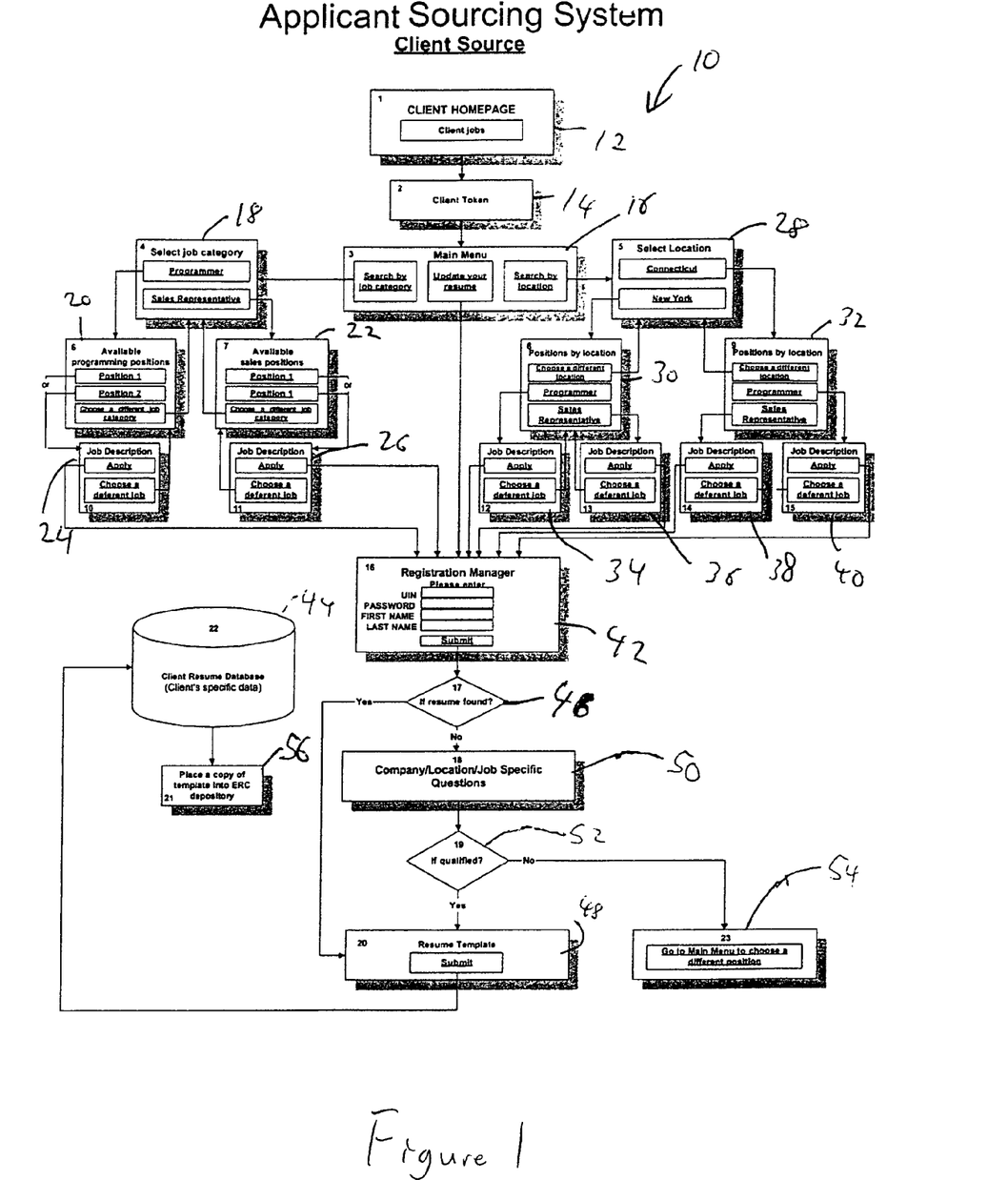
FIG. 1 is a schematic diagram of a system for implementing the method of the present invention.

In FIG. 1, a candidate enters the web site of the operator of system 10 from a client's homepage, as illustrated by step 12. Each new transfer from a client homepage at step 12 to system 10 accrues client-identifying "tokens" at step 14. These tokens are tallied to determine the sum each client is charges for use of system 10. A home page is presented to the candidate at step 3, comprising a main menu with three selectable options. Preferably, each option is represented by a three-dimensional button which may be "pushed" by placing the mouse pointer on it and clicking the left mouse button. At step 16, the candidate may search for jobs by job category, update his or her resume or search for jobs by location.

If the candidate chooses to search for jobs by job category, a new menu is presented to the candidate comprising the available jobs listed by category as established by the client from whose homepage the candidate entered system 10. Preferably, each new menu is a "pop-up" type menu. Step 18 illustrates, as an example, a menu showing available positions as a programmer and sales representative. Selecting either job category would provide new menus, as illustrated in steps 20, 22, 24 and 26, listing further information regarding the available positions and providing the candidate with the opportunity to apply for a position.

If the candidate selects to search by location, a similar path comprising menus, which are generated according to the candidate's geographical preference and show the available jobs at the available geographical locations, is illustrated in steps 28, 30, 32, 34, 36, 38 and 40.

The remaining selectable option in the main menu of step 16 provides the opportunity for the candidate to update his or her resume. Candidates choosing to update their resume have entered system 10 previously, presumably submitted a resume, and are immediately directed to the registration manager in step 42. As illustrated in FIG. 1, candidates choosing to apply for an available position are also eventually directed to the registration manager in step 42.

The registration manager in step 42 comprises a form requesting information about the candidate that must be completed by the candidate in order to make use of system 10. Each candidate is provided with a unique Universal Identification Number (UIN), and may choose a password. Preferably, the candidate must correctly enter their password only when returning to step 42 of system 10, or when returning to password-required areas of system 10 from non-password-required areas of system 10 or another website.

After the candidate submits the filled out registration form in step 42, a search for the candidate's resume in client's database 44 is performed in step 46. If it exists, the resume template, with information as previously submitted by the candidate, is displayed on the screen in step 48 and it can be updated by the candidate. If a resume does not already exist, the candidate is presented with client's job specific questions in step 50. Preferably, these questions may be multiple choice, answered by a "yes" or "no", or otherwise capable of being evaluated and scored immediately in step 52. If the candidate meets the criteria, the candidate will be directed to submit further information in step 48. If the candidate does not meet the criteria, then the candidate will be directed to the main menu of step 16, as illustrated in step 54, where the candidate may select a different position or quit the search.

?DOES A CANDIDATE WITH A RESUME ALREADY IN THE SYSTEM (step 46) GO THROUGH STEP 50, i.e., COMPANY SPECIFIC QUESTIONS, OR DOES THE SYSTEM COMPARE THE TEMPLATE WITH COMPANY SPECIFIC DATA?

Newly submitted or updated information in step 48 is directed to the client's resume database 44 and a copy is similarly stored in database 56 of system 10. Preferably, resume template in step 48 gathers other information about the candidate, including the candidate's job preferences.

Figure 2:
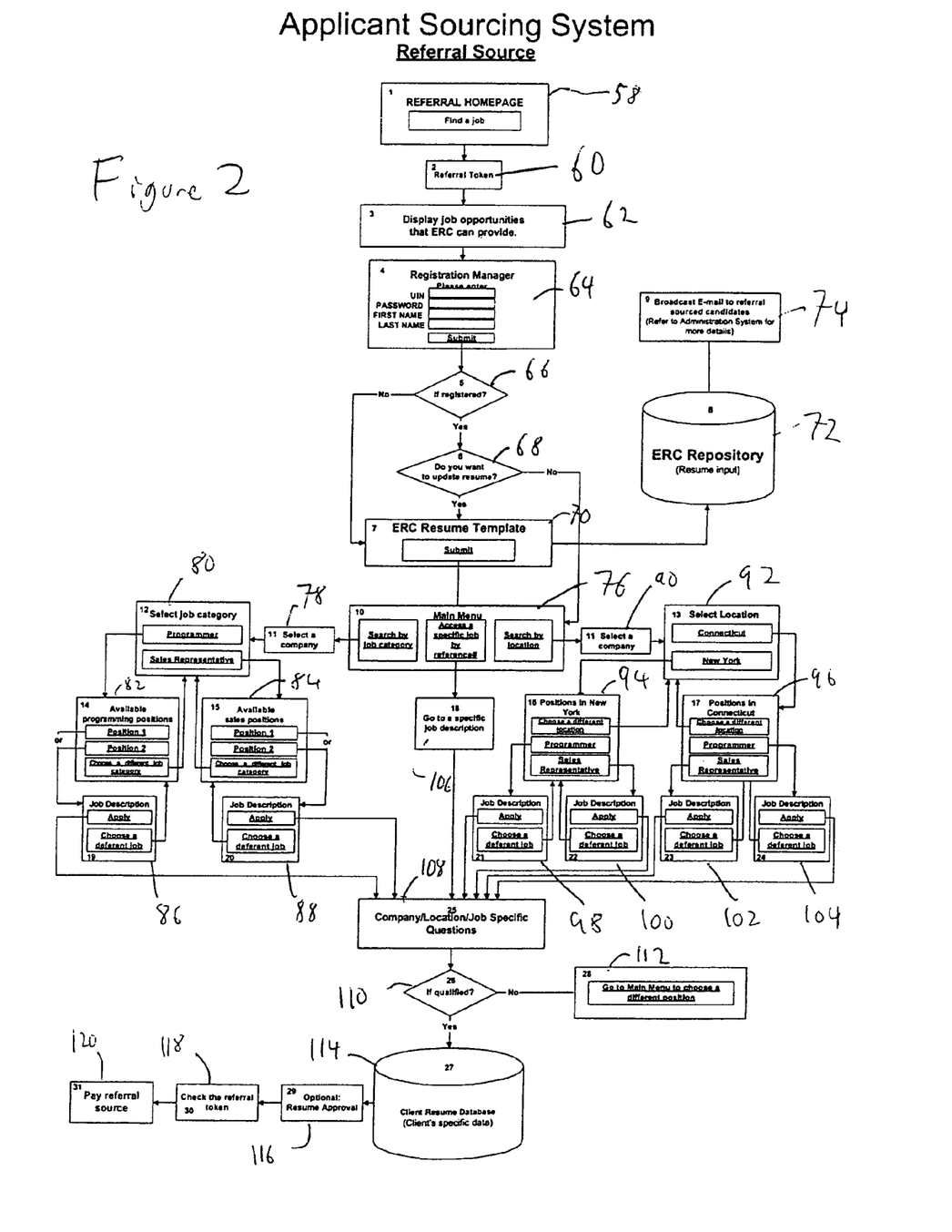
FIG. 2 is a schematic diagram of the method for implementing another aspect of the present invention.
Figure 3:
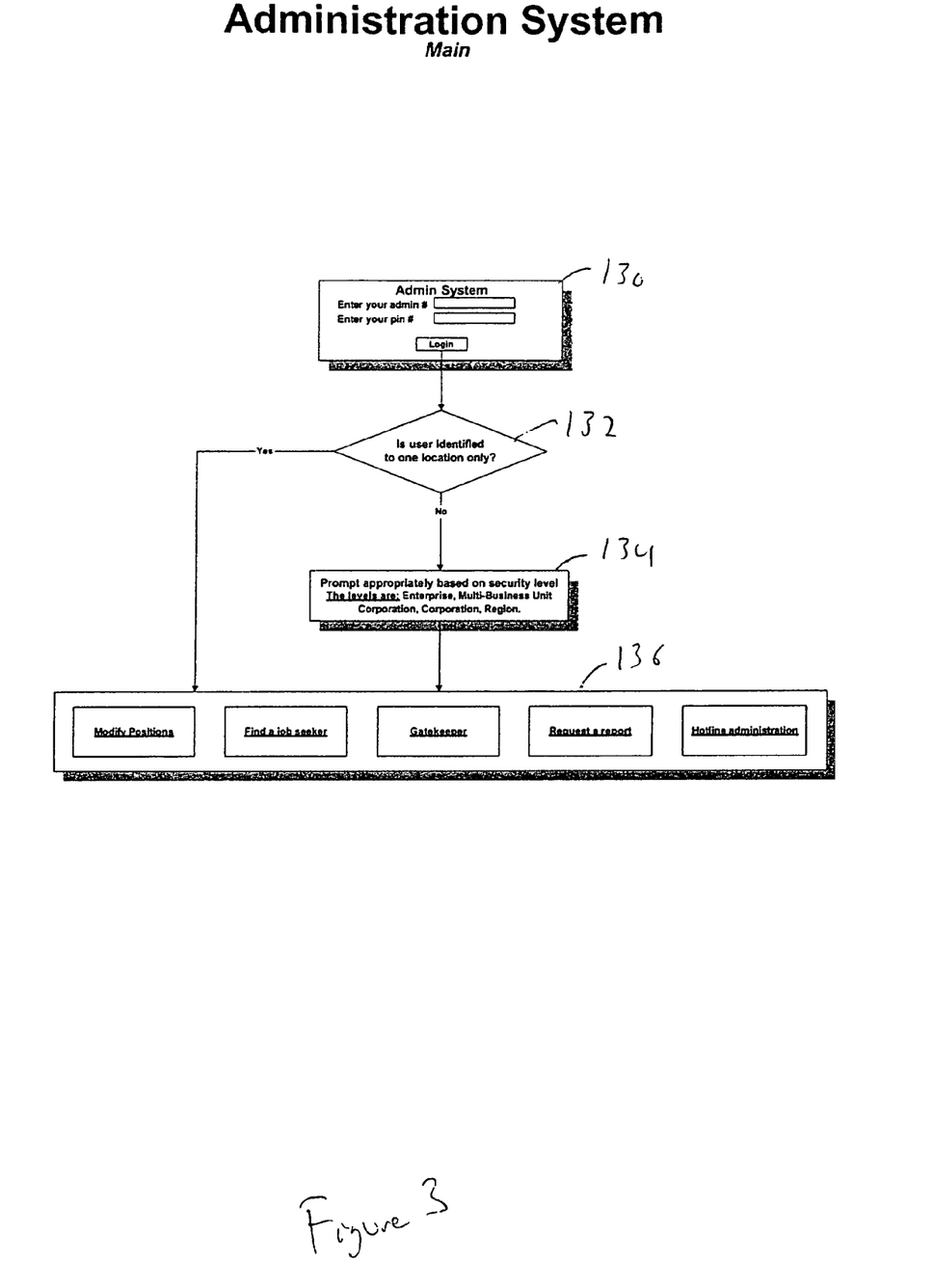
FIG. 3 is a flow chart illustrating operation of the administration system feature of the present invention.

Another aspect of the invention is illustrated in FIG. 2. Here, a candidate enters the website of the operator of system 10 via a referral source, such as an internet search engine. A job seeking candidate is directed from the referral homepage in step 58 to system 10, thus generating a "token" identifying the referral source in step 60. After entering system 10, a screen listing available job opportunities is provided to the candidate in step 62.

After selecting a job, the candidate is directed to the registration manager screen in step 64, which is analogous to step 42 in FIG. 1. As illustrated in steps 66-70, a previously registered candidate may update his or her resume or further pursue a job search offered the option of updating his or her resume if the candidate is already registered, and if the candidate is not registered, the candidate will be asked to fill out the resume template. The completed resume template is kept in the system database 72. If there is an available position that the candidate may be qualified for, based on information provided in the resume template screen, such as skills, experience, job preferences, etc., the candidate will be notified in step 74, preferably by email. In step 70, the candidate may eliminate particular employers from consideration or choose to restrict certain information from being forwarded to certain clients, such as personal identifiers.

After the resume template in step 70 is completed, the candidate is directed to the menu in step 76. The menu comprises options for searching available positions by job category and by location, as in step 16. Also, steps 78 through 104 illustrate the screens for selecting a company and position and applying for an available position, as in the aspect of the invention illustrated in FIG. 1. Step 76 illustrates a further option allowing the candidate to access a specific available position by entering a reference code, such as an alphanumeric identifier. Each available position is given a corresponding unique reference code. Entering a reference code in step 76 directs the candidate to that job description in step 106, and then on to the client-specific questions in step 108. If the candidate is not qualified, step 112 directs the candidate to the menu illustrated in step 76. If the candidate successfully completes the client-specific questions, the candidates resume, that is information inputted in step 70, is transferred from the system database illustrated by step 72, to the client resume database in step 114. Step 116 provides the opportunity for the client to review resumes before being added to including them in client search function in Administration System??? In this embodiment, step 118 illustrates the process of checking the referral token and paying the referral source only if the candidate is qualified.

FIGS. 3-6 illustrate one embodiment of a method for accessing the inventive device to perform administrative and executive functions. Entry to this part is restricted to maintain the confidentiality and security of the system, as shown by the password entry box in step 130. The administrator may be granted access to all or certain functions and areas within the inventive system. For example, a designation, such as enterprise, corporation, multi-business unit corporation, etc., may be used to indicate the level of security accessible. Step 136 illustrates five selectable options in this embodiment which are described below.

Figure 4:
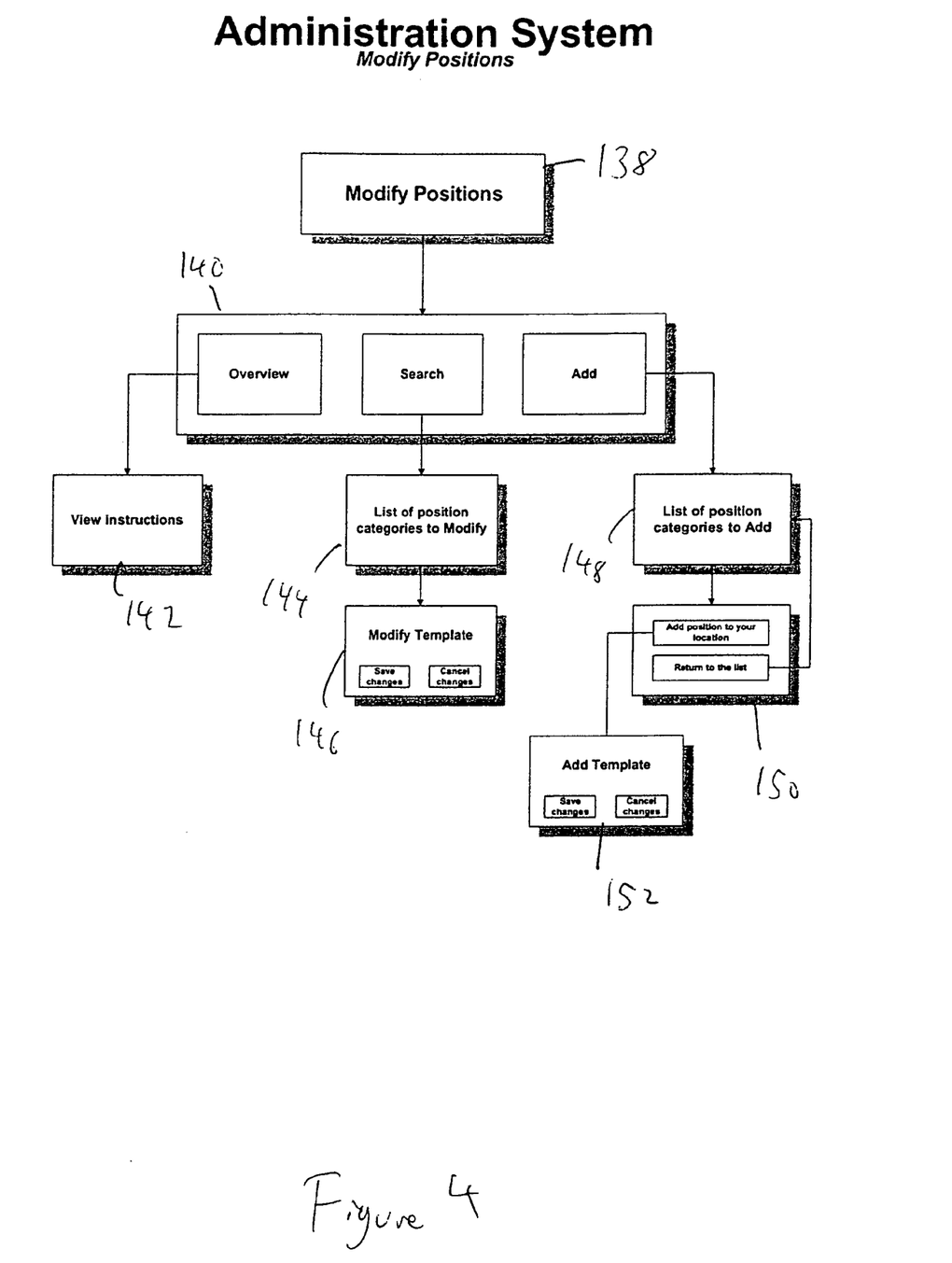
FIG. 4 is a flow chart illustrating operation of the "modify positions" aspect of the administration system.

The "modify positions" option is expanded in FIG. 4, and as illustrated by steps 138-152, allows the administrator to learn about, search for, access and alter job positions listed in the system.

Figure 5:
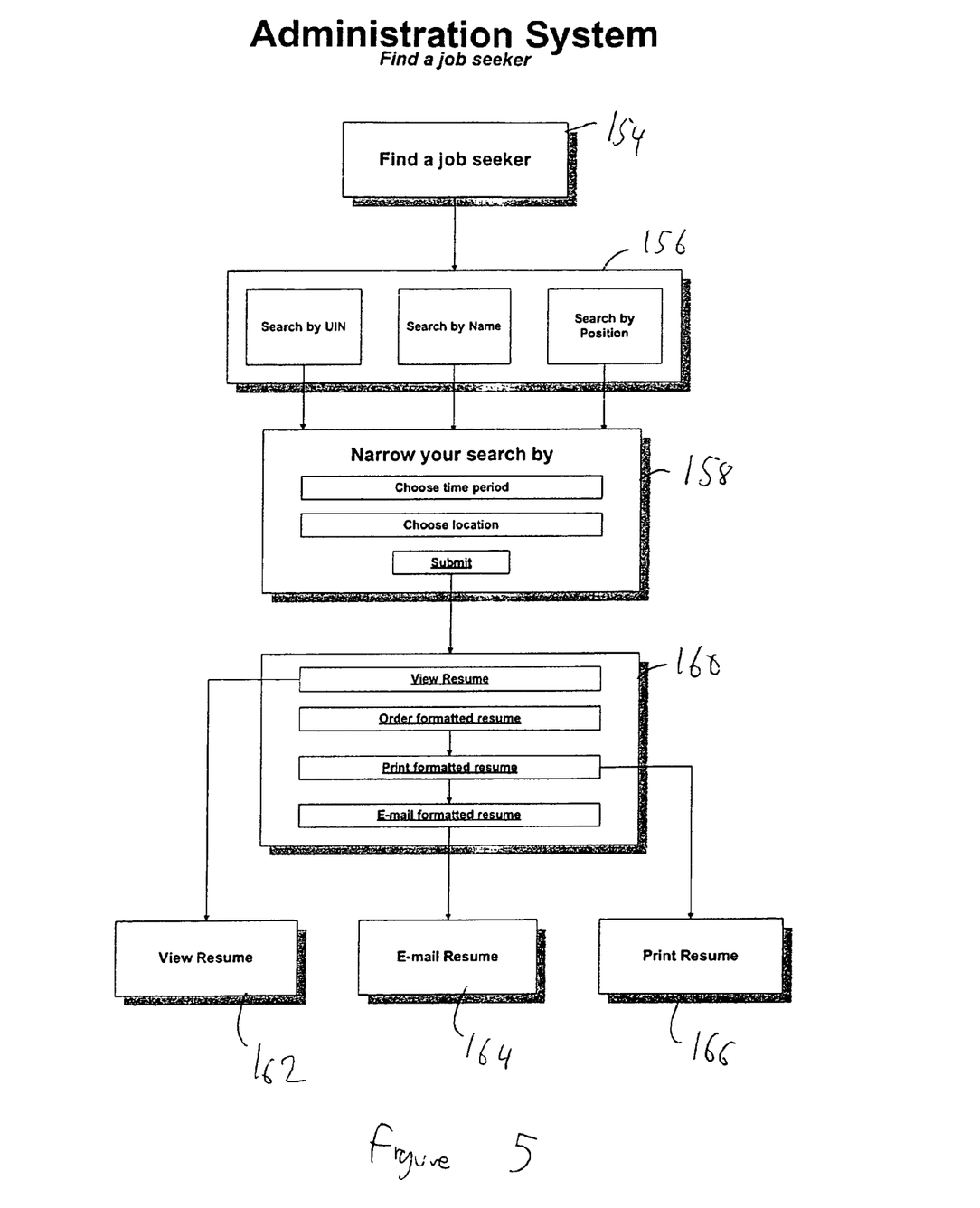
FIG. 5 is a flow chart illustrating operation of the "find a job seeker" aspect of the administration system.

The "find a job seeker" option is expanded in FIG. 5, and as illustrated by steps 154-166, all the administrator to search the system database for candidate information by identification number, name or position. Once located, the candidate's resume may be viewed, printed or sent via e-mail.

Figure 6:
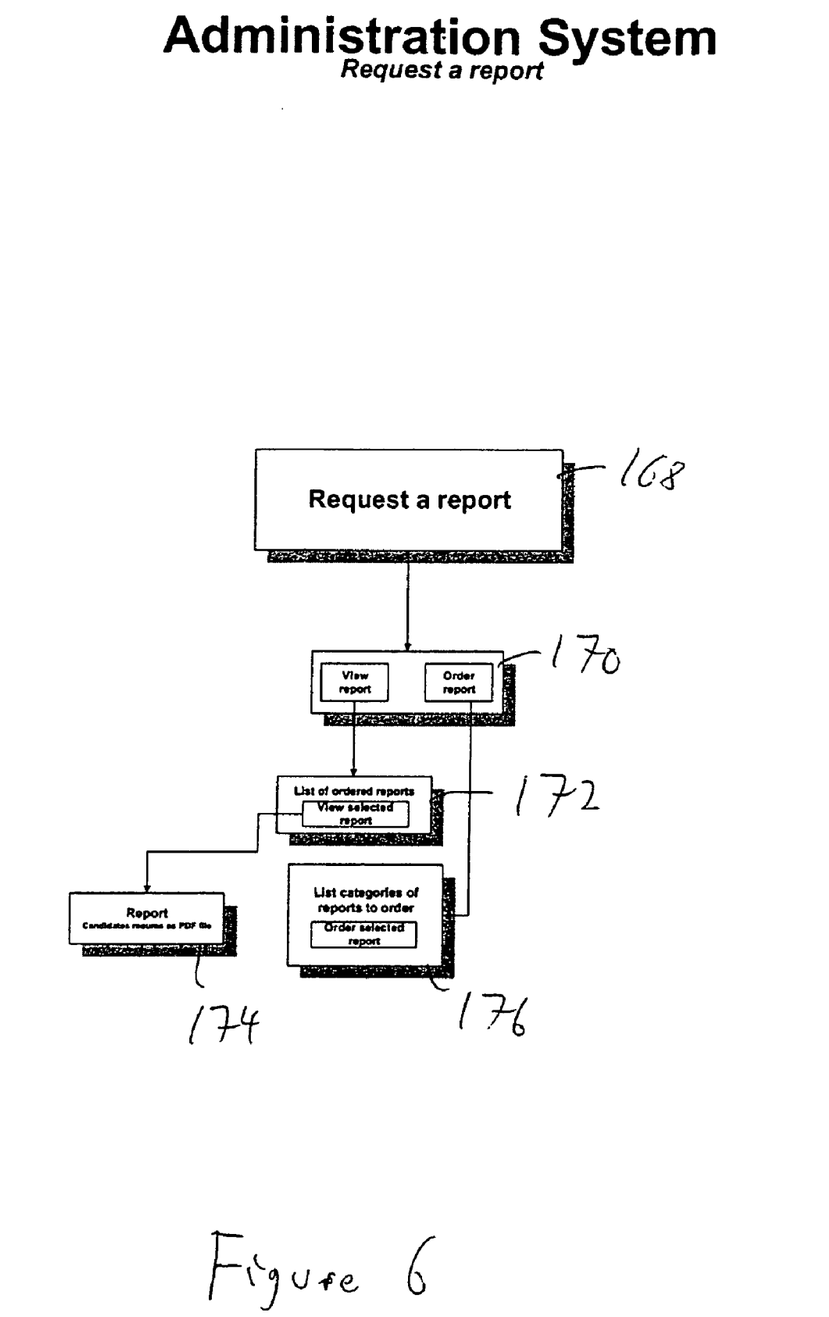
FIG. 6 is a flow chart illustrating operation of the "request a report" aspect of the administration system.

The "request a report" option is expanded in FIG. 6 as illustrated by steps 168-176. The administrator may view and select from pre-designed reports comprising various system performance data or order a custom made report comprising the particular categories desired.

Figure 7:
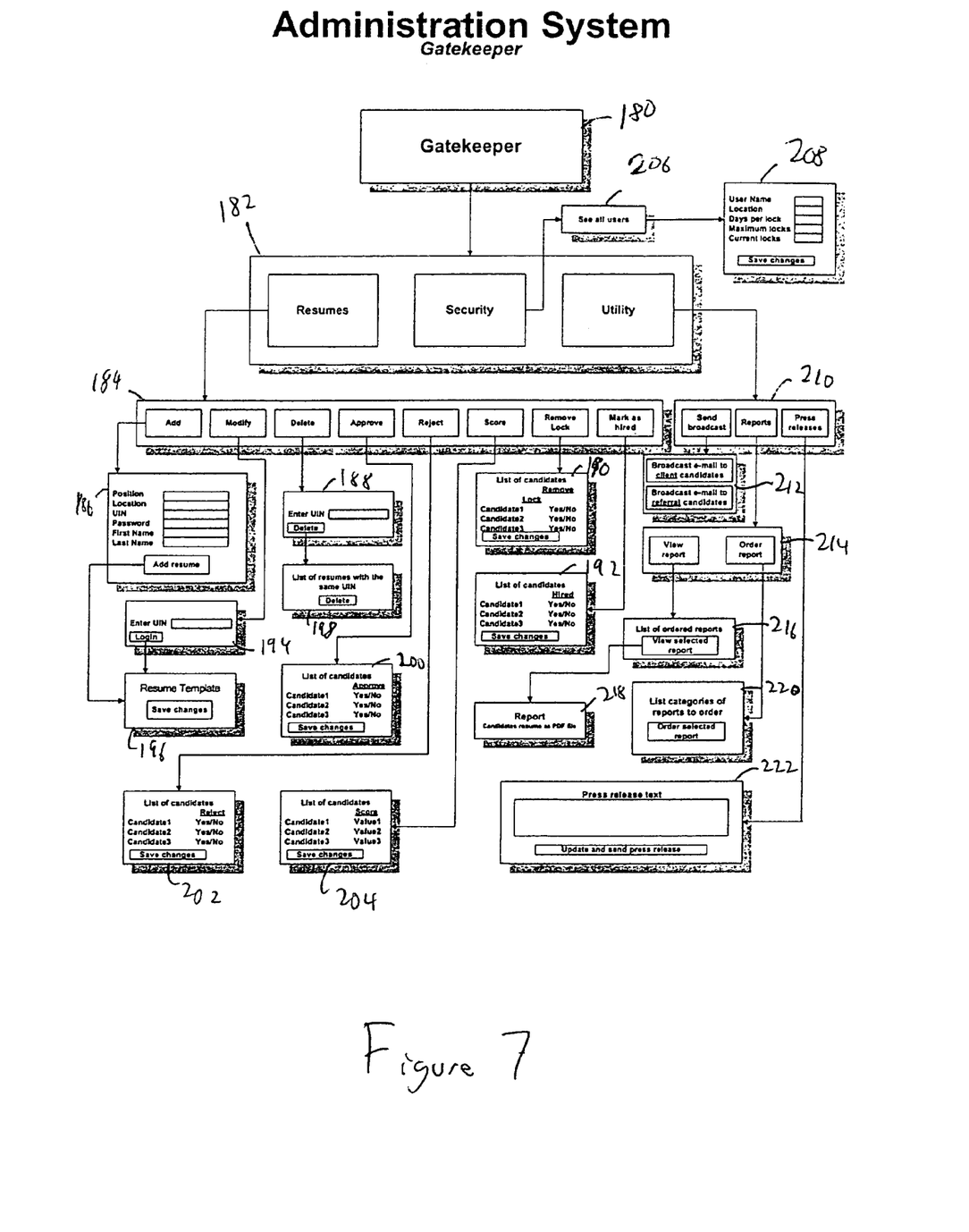
FIG. 7 is a flow chart illustrating operation of the "gatekeeper" aspect of the administration system.

The "gatekeeper" option is expanded in FIG. 7. There are three main accessible areas illustrated in this embodiment of the invention. The "resume" area in step 182 provides further administrative options to modify, add, delete resumes. Also shown in steps 184-204, resumes may be manually scored, approved, rejected, locked or marked as hired. The "security" area, as illustrated by steps 206-208, comprises menus for setting, adjusting and controlling the level of all users clearance in the system. The "utility" area, illustrated by steps 210-222, provides a means for sending email broadcasts, generating reports and creating press releases.

Figure 8:
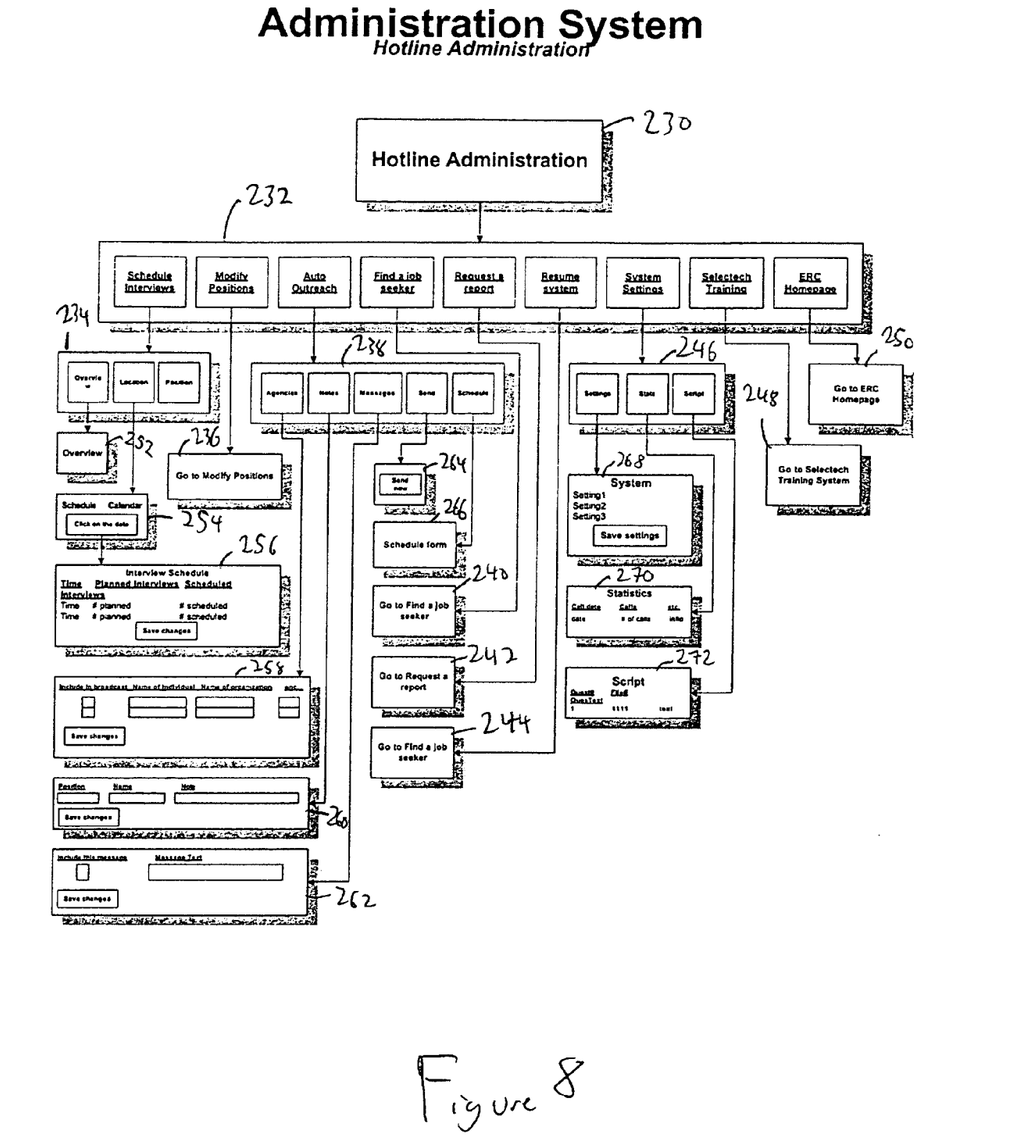
FIG. 8 is a flow chart illustrating operation of the "hotline administration" aspect of the administration system; and, FIG. 9 is a flow chart illustrating operation of the "hired protection system" feature of the present invention.

The "hotline administration" option is expanded in FIG. 8. As illustrated in steps 232-272, the options in this menu comprise mechanisms for setting functions and adjusting system parameters such as sending automatic messages, changing system settings, scheduling interviews, etc. Also, access to the resume database, system homepage and system training is provided.

Figure 9:
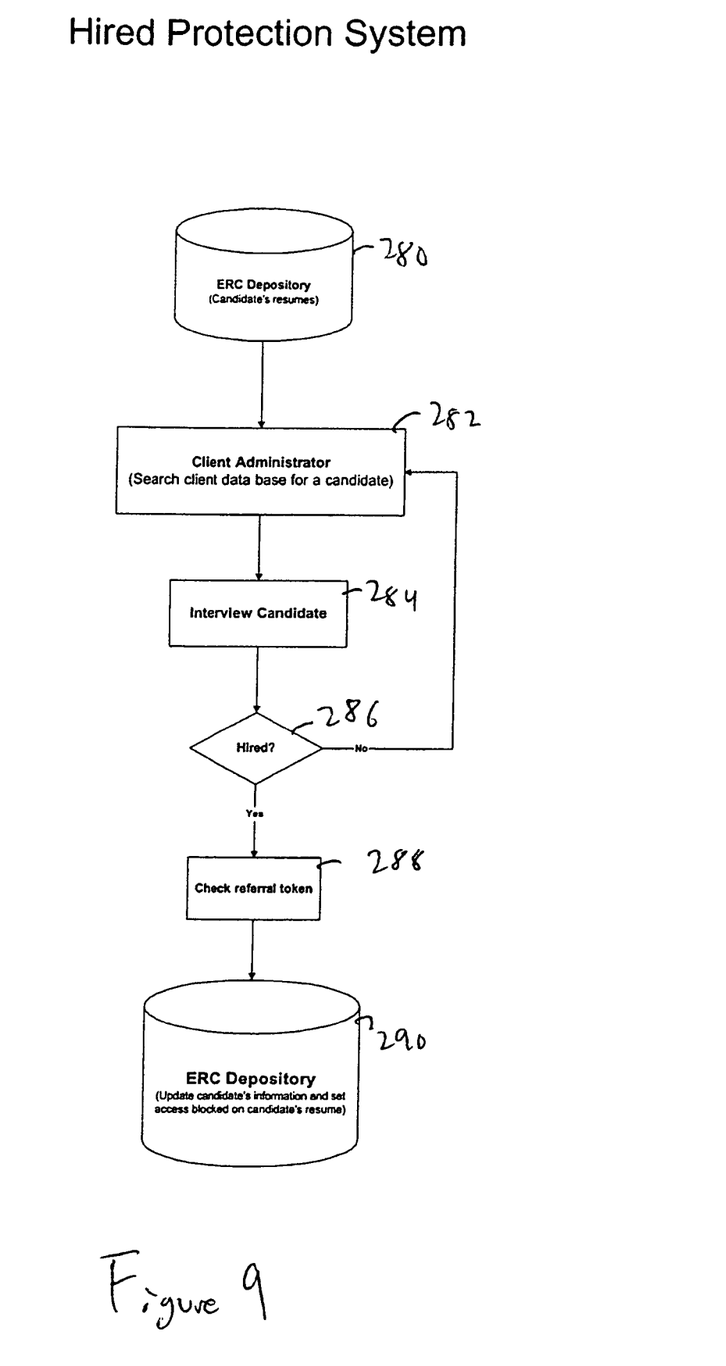

FIG. 9 illustrates the hired protection system which ensures that the referral source for a hired candidate is compensated and prevents the candidate's resume from being further accessed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

The invention claimed is:

1. A method, comprising:
   (a) implementing an employment sourcing website on a publicly accessible network;
   (b) implementing on said publicly accessible network a first organization specific website associated with a first organization;
   (c) receiving employment specific information on a plurality of positions for a plurality of positions at said first organization from said first organization;
   (d) presenting an employment hyperlink on said first organization specific website;
   (e) transferring a first website visitor, visiting said first organization specific website over said publicly accessible network, from said first organization specific website to said employment sourcing website, said transfer being implemented in response to clicking of said employment hyperlink on said first organization specific website;
   (f) in response to clicking of said employment hyperlink on said first organization specific website by said first visitor, presenting said employment sourcing website in a style which mimics said first organization specific website;
   (g) receiving criteria respecting acceptable candidates for each of said plurality of employment positions from said first organization and a first series of questions associated with said criteria;
   (h) presenting, over said publicly accessible network, said information on said plurality of employment positions from said first organization to said first visitor on said employment sourcing website;
   (i) receiving, over said publicly accessible network, a selection of one of said employment positions from said first website visitor;
   (j) presenting, over said publicly accessible network, said first series of questions on said employment sourcing website to said first visitor, seeking information respecting said first visitor, said first series of questions being associated with said selected employment position;
   (k) receiving, over said publicly accessible network, answers to said first series of questions from said first website visitor, said answers comprising information on said first website visitor;
   (l) scoring said answers from said first website visitor against said criteria for the selected employment position to determine whether information on said first visitor should be sent to said first organization; and
   (m) charging said first organization in response to a scoring determination that information on said first visitor should be sent to said first organization.

2. A method as in claim 1, further comprising:
   (n) presenting a second employment hyperlink on a third website associated with a third entity;
   (o) transferring a second website visitor, visiting said third website over said publicly accessible network, from said third website to said employment sourcing website, said transfer being implemented in response to clicking of said second employment hyperlink on said third website;
   (p) presenting, over said publicly accessible network, said information on said plurality of employment positions from said first organization to said second visitor on said employment sourcing website;

(q) receiving, over said publicly accessible network, a selection of one of said employment positions from said second website visitor;

(r) presenting, over said publicly accessible network, said first series of questions on said employment sourcing website to said second visitor, seeking information respecting said second visitor, said first series of questions being associated with said selected employment position;

(s) receiving, over said publicly accessible network, answers to said first series of questions from said second website visitor, said answers comprising information on said second website visitor;

(t) scoring said answers from said second website visitor against said criteria for the selected employment position to determine whether information on said second visitor should be sent to said first organization; and (u) crediting said third entity in response to a scoring determination that information on said second visitor should be sent to said first organization.

3. A method as in claim 2, further comprising a second organization specific website associated with a second organization, said second organization specific website having an employment icon which functions to bring visitors to said employment sourcing website to achieve functionalities with respect to a plurality of employment positions associated with said second organization.

4. A method as in claim 3, further comprising a fourth website comprising an employment icon which connects a visitor visiting said fourth website to said employment sourcing website, said visitors entering said employment sourcing website from said fourth website having access to information on employment positions associated with said first and second organizations.

5. A method, comprising:

(a) implementing an employment sourcing website on a publicly accessible network;

(b) receiving employment specific information on a plurality of positions at a plurality of organizations in search of employees to fill said positions;

(c) receiving criteria respecting acceptable candidates for each of said plurality of employment positions from said plurality of organizations and questions associated with said criteria;

(d) presenting, over said publicly accessible network, an employment hyperlink on a referring website;

(e) transferring a website visitor, visiting said referring website over said publicly accessible network, from said referring website to said employment sourcing website, said transfer being implemented in response to clicking of said employment hyperlink on said referring website;

(f) presenting, over said publicly accessible network, said information on said plurality of employment positions to said website visitor on said employment sourcing website;

(g) receiving, over said publicly accessible network, a selection of one of said employment positions from said website visitor;

(h) presenting, over said publicly accessible network, said questions on said employment sourcing website to said website visitor, seeking information respecting said website visitor, said questions being associated with said selected employment position;

(i) receiving, over said publicly accessible network, answers to said questions from said website visitor, said answers comprising information on said website visitor;

(j) scoring said answers from said website visitor against said criteria for the selected employment position to determine whether information on said website visitor should be sent to a respective one of said plurality of organizations associated with said selected one of said employment positions; and (k) crediting said referring website in response to a scoring determination that information on said website visitor should be sent to the respective organization associated with said selected one of said employment positions.

6. A method as in claim 5, wherein said criteria and said questions are received from said organizations.

7. A method as in claim 5, wherein said questions request information from website visitors desirous of applying for said positions.

8. A method as in claim 5, wherein said questions are in the nature of a test to be taken by website visitors.

9. A method as in claim 5, further comprising receiving at said employment sourcing website an indication that said website visitor is being considered for a position and blocking information on said website visitor from further use.

10. A method as in claim 5, wherein the organization, with respect to which a website visitor has submitted answers which have been scored against said criteria to cause information on said website visitor to be taken to the organization associated with said selected one of said employment positions, pays a fee upon receiving said information.

11. A method as in claim 5, further comprising maintaining a database of questions and answers and notifying visitors when positions suitable for a visitor have been received by the employment website.

12. A method according to claim 11 wherein the web site visitor provides said information in a web page, wherein the web page has a universal resource locator and wherein the universal resource locator of the web page is stored in the database.

13. A method as in claim 5, further comprising receiving from said employment sourcing website an indication that said website visitor is being considered for a position, and blocking said website visitor from further use of the employment sourcing website and blocking information on said website visitor from being transmitted by said employment sourcing website.

14. A method as in claim 5, wherein said criteria and said questions are received from said organizations, said questions request information from referring website visitors desirous of applying for said positions, said questions are in the nature of a test to be taken by referring website visitors, and wherein the organization, with respect to which a referring website visitor has submitted answers which have been scored against said criteria to cause information on said visitor to be taken to the organization associated with said selected one of said employment positions, pays a fee upon receiving said information, and further comprising maintaining a database of questions and answers and notifying visitors when positions suitable for a visitor have been received by the employment sourcing website, and receiving from said employment sourcing website an indication that said referring website visitor is being considered for a position and blocking said referring website visitor from further use of the employment sourcing website and blocking information on said visitor from being transmitted by said employment sourcing website.

15. A method as in claim 14, further comprising receiving at said employment sourcing website an indication that said referring website visitor is being considered for a position and blocking said website visitor from further use of the employment sourcing website.

16. A method as in claim 5, further comprising receiving at said employment sourcing website an indication that said referring website visitor is being considered for a position and blocking information on said employment sourcing website from further use and wherein the organization, with respect to which a website visitor has submitted answers which have been scored against said criteria to cause information on said visitor to be taken to the organization associated with said selected one of said employment positions, pays a fee upon receiving said information.

17. A method as in claim 5, wherein the answers from the website visitor are scored using for each question values set by the organization associated with the respective employment position.

18. A method as in claim 5, further comprising providing an opportunity for the respective organization to review and approve a website visitor's submission of information.

19. A method according to claim 18 wherein approval of a website visitor by the respective organization triggers a check for a referral source for the website visitor and payment of a referral fee to the referral source, if appropriate.

20. A method according to claim 5 wherein the presenting, over said publicly accessible network, of an employment hyperlink is effected on a plurality of referring websites.

21. A method according to claim 5 wherein said employment hyperlink is on a web page, the method further comprising employing referral data associated with the web site visitor and wherein the referral data identifies the web page having the employment hyperlink.

\* \* \* \* \*